United States Patent [19]

Renner et al.

[11] 4,307,005
[45] Dec. 22, 1981

[54] AQUEOUS EMULSION PAINTS CONTAIN ORGANIC WHITE PIGMENTS

[75] Inventors: Alfred Renner, Münchenstein; Werner Margotte, Lupsingen, both of Switzerland

[73] Assignee: Ciba-Geigy Corporation, Ardsley, N.Y.

[21] Appl. No.: 130,763

[22] Filed: Mar. 17, 1980

[30] Foreign Application Priority Data

Mar. 27, 1979 [CH] Switzerland .......................... 2827/79

[51] Int. Cl.$^3$ .............................................. C08L 61/24
[52] U.S. Cl. ................... 260/29.4 UA; 260/29.6 NR; 260/39 P; 428/528
[58] Field of Search ........... 260/29.4 UA, 39 P, 39 R, 260/42.21, 29.6 NR; 525/157

[56] References Cited

U.S. PATENT DOCUMENTS 3,737,404   6/1973  Berstein ............................. 260/39 R
3,836,495   9/1974  Berstein ............................. 260/39 R
3,849,378  11/1974  Griffiths et al. .................... 260/69 R
3,953,421   4/1976  Berstein ............................. 260/39 R

OTHER PUBLICATIONS

Chem. Abst., vol. 87, (1977), p. 84, (41001r).
A. Renner, Die Makro. Chem., 149, (1971), 1 to 27.

Primary Examiner—Theodore E. Pertilla
Attorney, Agent, or Firm—Luther A. R. Hall

[57] ABSTRACT

The aqueous emulsion paints according to the invention contain urea-formaldehyde white pigments having very characteristic physical properties. Compared with aqueous emulsion paints according to the prior art, which in addition to $TiO_2$ can contain only a maximum of 20% by weight of UF white pigments based on the entire content of white pigments, according to the invention $TiO_2$ may be substituted up to 100% by the UF white pigment. The resultant finishes are fast to light, weather and abrasion.

3 Claims, No Drawings

AQUEOUS EMULSION PAINTS CONTAIN ORGANIC WHITE PIGMENTS

BACKGROUND OF THE INVENTION

The present invention relates to aqueous emulsion paints which contain urea-formaldehyde condensation polymers as white pigments. Aqueous emulsion paints which contain special urea-formaldehyde polymers having a specific surface area of 15 to 100 m$^2$/g and a bulk density of less than 100 g/l as white pigments in addition to TiO$_2$ have already been described in U.S. Pat. Nos. 3,737,404 and 3,836,495. A conspicuous feature of these emulsion paints is that the amount of urea-formaldehyde white pigment is only about 2 to 20% by weight, based on the total volume of white pigment. The reason for the limitation is evidently that further replacement of TiO$_2$ by the urea-formaldehyde white pigment (i.e. raising the concentration to above 20% by weight) results in such a pronounced thickening and unfavourable change in rheological properties that the viscous mass is no longer suitable for coating purposes. The urea-formaldehyde polymers described in the patent specifications referred to above thus act as extenders for titanium dioxide. In view of this prior art, the assumption necessarily was that it will not be possible to prepare emulsion paints of high hiding power and with a high degree of whiteness in which urea-formaldehyde polymers do not act as extenders but as white pigment, and are able to replace the titanium dioxide completely or to a great extent in such paints. However, substitution of organic white pigments for titanium dioxide would be desirable for the following reasons. At the present time, a shortage of high-grade titanium ores (rutile, ilmenite, brookite, anatase) is already perceptible and their almost complete exhaustion is foreseeable. To save resources it seems logical to preserve titanium ores chiefly as metallurgical raw materials instead of processing them to white pigments which are exposed to weathering and rapid wear in paints. On the other hand, the basic raw materials for urea-formaldehyde white pigments (earth gas, petroleum, coal) seem ensured for much longer. In addition, a number of technical advantages make it appropriate to substitute urea-formaldehyde pigments for TiO$_2$ in emulsion paints. The high specific weight of TiO$_2$ of 4.26 g/cm$^3$ not only makes it necessary to add special ingredients in order to prevent sedimentation in the emulsion paint, but also increases the specific weight of the paint. As the object of applying a coat is to cover a specific area with a specific volume of paint, it is possible to coat a larger area with a specifically lighter paint which contains a urea-formaldehyde white pigment having a specific gravity of $d_{20} = 1.40$. If it is desired to obtain a coherent film after drying, pigments and fillers may not exceed a specific percentage of solid pigment by volume in the film. This percentage is known as the critical pigment volume concentration. Because of the specific weights, 330 g of urea-formaldehyde white pigment take up the same volume as 1 kg of rutile, or 1 kg of urea-formaldehyde takes up the same volume as 1 kg of TiO$_2$ + 1.25 kg of CaCO$_3$. This last substitution results in paints having the same hiding power and whiteness as illustrated in the working Examples. As urea-formaldehyde white pigments can be obtained very much more cheaply than TiO$_2$, a substantial cost advantage accrues to the paint manufacturer.

It is, of course, not possible to manufacture urea-formaldehyde pigments which have as high a refractive index as that of titanium dioxide (2.6–2.9). It is therefore all the more surprising that it is possible to obtain emulsion paints of comparable hiding power and whiteness with urea-formaldehyde pigments which have only a refractive index of 1.65, i.e. similar to that of the polymer binders. It has been found that this is determined by specific particle and agglomerate structures which can be described by the parameters: particle diameter, pore volume and light scattering coefficient.

SUMMARY OF THE INVENTION

Accordingly, the invention provides aqueous emulsion paints which contain emulsified or suspended organic binders, a solid urea-formaldehyde condensation polymer as white pigment and optionally further inorganic pigments and/or fillers and conventional assistants, said urea-formaldehyde condensation polymer having a light scattering coefficient of $\geq 800$ cm$^2$/g, a pore volume of $\leq 3$ cm$^3$/g, an average primary particle diameter of 0.2 to 2 μm, a melting range (on decomposition) of 240° to 260° C., and a bulk density of $>100$ g/l.

The organic binders contained in the emulsion paints of this invention are those customarily employed for the purpose selected from the group consisting of polyvinyl acetate, polyvinyl chloride, polyvinylidene chloride and the corresponding copolymers, acrylic polymers and copolymers, for example with styrene, styrene-butadiene copolymers and butadiene-acrylonitrile copolymers. Such binders are chiefly in the form of aqueous emulsions, but individually can also be in the form of suspensions. They can contain one or more binders and are referred to as "latices" from the terminology of rubber technology.

The emulsion paints of this invention can additionally contain inorganic pigments and/or fillers (individually or in admixture), for example selected from the group consisting of CaCO$_3$, MgCO$_3$, kaolin, talc, mica, zinc oxide, barytes and TiO$_2$ (rutile or anatase). Further, the emulsion paints can also contain conventional assistants. Such assistants are e.g. protective colloids, such as methyl cellulose, hydroxyethyl cellulose and the sodium salt of carboxymethyl cellulose. A known carboxymethyl cellulose is e.g. Tylose 4000, manufactured by Kalle A.G., West Germany. Non-ionic surfactants such as Irgarol ND 33 ®, manufactured by CIBA-GEIGY AG, and ammonium salts of low viscosity polyacrylic acids, are suitable for prolonging the shelf-life. An aqueous, c. 30% solution of such a salt is e.g. the pigment disperser A ®, manufactured by BASF A.G. A polyphosphate sold under the registered trade mark Calgon N ® by Benckiser-Knapsack GmbH, Germany, and which can be combined very advantageously with the pigment disperser A ®, has a similar action. Further products to be mentioned here are the non-ionic emulsifier Emulan OC (20%), available from BASF, and the surfactant Nopco 8034 ®, manufactured by Diamond Shamrock Chemicals AG, Switzerland. It is often advantageous if the emulsion paints of the present invention also contain fluorescent whitening agents, e.g. Tinopal 2 BF ® (a 4,4'-bis(triazinylamino)-stilbene-2,2'-disulfonic acid derivative) manufactured by CIBA-GEIGY AG. The addition of surfactants often also prevents foam formation both in the production of the emulsion paints and during their application. Further, the emulsion paints can also contain NH$_3$, solvents and levelling agents as well as preservatives (fungicides and biocides).

The advantageous concentration of the total constituents in the respective emulsion paint which forms the final film after application, is 50 to 75% by weight, based on the entire aqueous emulsion paint. The ratio of pigments to the organic binders in these total constituents, without water and other volatile substances, is between 10 and 1.

Those aqueous emulsion paints which contain $TiO_2$ as additional inorganic pigment, and in which the weight ratio of $TiO_2$ to urea-formaldehyde condensation polymer is less than 4, constitute a preferred embodiment of the invention. Such emulsion paints are especially suitable for exterior finishes if the ratio of pigments and fillers to organic binders is 1.5 to 4.

DETAILED DESCRIPTION OF THE INVENTION

Especially preferred aqueous emulsion paints of the present invention are also those which contain only the urea-formaldehyde polymer as white pigment. These preferred emulsion paints are especially suitable for interior finishes if the weight ratio of pigment to organic binder is 4 to 10.

The emulsion paints of the present invention are suitable for obtaining finishes on masonry, wood, resin-bonded chipboards, wallpapers, concrete and asbestos cement. Semi-gloss paints and wood fillers can also contain urea-formaldehyde white pigments.

In conclusion, it must be emphasised once more that it is especially surprising that urea-formaldehyde white pigments have been found which result in such advantageous rheological properties of aqueous emulsion paints that it is possible to increase the amount of the urea-formaldehyde white pigment in the $TiO_2$/urea-formaldehyde white pigment mixture up to 100% without impairing the applicability of the emulsion paints. The pore volume of $<3$ cm$^3$/g is an essential prerequisite for this feature.

The urea-formaldehyde condensation polymers employed as white pigments in this invention are known per se. In this connection attention is drawn e.g. to German Offenlegungsschrift No. 2 547 966, in which, inter alia, Example 2 describes the manufacture of a urea-formaldehyde condensation polymer which is to be used as a white pigment in the practice of this invention.

Attention is also to the publication of A. Renner in "Die Makromoleculare Chemie," 149, 1 to 27 (1971), wherein the manufacture of the urea-formaldehyde white pigments which can be used in the practice of this invention are described (e.g. under section 9.1).

It is preferred that the urea-formaldehyde white pigments used in the practice of this invention are manufactured under the following conditions by polycondensation of urea and formaldehyde: ratio of formaldehyde to urea=0.85 to 1.7; concentration of urea and formaldehyde (together): 20 to 45% by weight; absence of protective colloids; reaction temperature 20° to 100° C.; reaction time 4 to 5 hours; use of acids having a pK of $\leq 4$ as catalysts (e.g. $H_2SO_4$, HCl and sulfamic acid). Condensation is often carried out in two steps, in which case the precondensation and the final condensation are effected at different pH values. The precondensation is often carried out initially with a part of the urea in question, followed by the final condensation after addition of the remaining amount of urea. The precondensation results usually in a polymer dissolved in water, whereas the second step yields the final insoluble urea-formaldehyde white pigment. After the urea-formaldehyde white pigment has been isolated (e.g. by filtration) and dried, it is usually mechanically comminuted once. An air jet mill is especially suitable for this purpose.

The invention is illustrated in more detail by the following Examples, in which the parts are by weight.

PREPARATORY EXAMPLES (a) Manufacture of urea-formaldehyde white pigments

Example (a): UF white pigment A 315 parts of deionised water, 120 parts of urea and 450 parts of aqueous formaldehyde solution (30% by weight) are condensed for 2 hours at 50° C. and pH 7. The precondensate is rapidly stirred with a solution of 10 parts of $H_2SO_4$ in 170 parts of water, whereupon a hard gel forms after a few seconds. This gel is kept for 2 hours at 65° C., then it is comminuted, and suspended in water. The suspension is adjusted to pH 9 with NaOH, filtered, and the filter cake is dried to constant weight. Yield: 228 parts. The dry solid product is passed through an air jet mill to produce a fine, white powder having an average agglomerate size of 3.7 μm. A scanning electron microscope image shows spherical primary particles having a diameter of 0.8–1.2 μm.

Melting point: 247°–249° C. (decomp.) Specific light scattering coefficient: 3000 cm$^2$/g Pore volume: 1.71 cm$^3$/g.

Example (b): UF white pigment B

A precondensate is prepared from 180 parts of urea and 300 parts of 30% aqueous formaldehyde solution (2 hours at 50° C. and pH 7). This precondensate is rapidly stirred with a solution of 25 parts of sulfuric acid in 170 parts of water and allowed to react for 2 hours at 70° C. The product is then worked up as described in Example (a). Yield: 230 parts of pigment having a specific scattering coefficient of 1500 cm$^2$/g and a pore volume of 1.524 cm$^3$/g. Melting point: 250°–252° C. (decomp.).

Example (c): UF white pigment C

This pigment is prepared in accordance with the particulars of Example 2 of German Offenlegungsschrift No. 2 547 966 (BASF AG), but is likewise ground to an agglomerate size of 3.5 μm in an air jet mill. A Raman line at 810 cm$^{-1}$ shows the preence of urone rings in this polymer pigment. It has a pore volume of 0.86 cm$^3$/g and a specific scattering coefficient of 2850 cm$^2$/g.

Melting point: 244°–246° C. (decamp.).

Example (d): UF white pigment D 316.5 parts of urea are dissolved in 966 parts of water, then 497 parts of a 30% aqueous formaldehyde solution with a pH of 6.2 are added and this reaction mixture is allowed to stand for 2 hours. After this time it has a pH value of 8.0 and a temperature of 23° C. Then 2000 parts of $H_2O$ and 750 parts of 1 N HCl are added. The temperature rises to 31.5° C. and the batch is allowed to react for 1 hour. The product is collected by filtration, washed and dried at 105° C. and ground in an air jet mill. Yield: 359 parts of pigment with a specific scattering coefficient of 800 cm$^2$/g and a Hg-pore volume of 0.89 cm$^3$/g. Melting point: 249°–250° C. (decomp.).

Example (e): UF white pigment E

This pigment is prepared in accordance with the particulars given by A. Renner in "Die Makromolekulare Chemie," 149, 1-27 (1971), section 9.1 (page 25). Pore volume: 1.02 cm$^3$/g; specific scattering coefficient 1000 cm$^3$/g; melting point 254°–255° C. (with decomp.).

Particulars regarding the methods of measurement

The light scattering coefficient was determined by a graph method described by P. B. Mitton and A. E. Jacobson in "New Graph for computing scattering coefficient and hiding power," Official Digest, 35, (1963) 871-913, (USA).

The pore volumes were measured with a mercury pressure porosimiter available from Messrs Carlo Erba, Milan. The method of V. Alongi was employed; see Chemische Rundschau 20 (1967), 913-917.

(β) Manufacture of the emulsion paints

Examples 1 to 5 (emulsion paints for interior finishes)

The composition of the emulsion paints according to Examples 1 to 5 and the first Comparison Example is described in Table 1. The paints are milled in a corundum disc mill.

Paints of good brush viscosities [measured with a Brookfield viscosimeter at 3 different speeds of rotation (cyclinder 5)] are obtained. They are non-Newtonian fluids. The viscosities are reported in Table 2.

TABLE 2

Viscosity measurements

| Example | 1 | 2 | 3 | 4 | 5 | 1st Comparison Example |
|---|---|---|---|---|---|---|
| viscosity (cP) | | | | | | |
| at 20 rpm $^{-1}$ | 5680 | 9800 | 11400 | 10400 | 5080 | 11200 |
| at 50 rpm $^{-1}$ | 3310 | 5760 | 6550 | 6080 | 3266 | 6400 |
| at 100 rpm $^{-1}$ | — | 3880 | 4360 | 4000 | — | 4300 |

Using a triangular film applicator with a 200 μm recess, films of the paints obtained are applied to 07P opacity panels manufactured by Morest Co. Inc., Freeport N.Y., and left to dry in the air for 24 hours. White, opaque, homogeneous films having a thickness of about 110 μm are obtained. The opacity (contrast ratio) of these films is determined by measuring the reflectance over the black and over the white field of the substrate. The degree of whiteness according to Stensby is also measured. The results are reported in Table 3.

TABLE 3

Optical measurements

| Example | 1 | 2 | 3 | 4 | 5 | 1st Comparison Example |
|---|---|---|---|---|---|---|
| opacity | 99.4 | 99.3 | 98.6 | 98.9 | 99.3 | 99.5 |
| degree of whiteness over white | 91 | 87 | 87 | 87 | 87 | 87 |
| degree of whiteness over black | 91 | 88 | 88 | 88 | 89 | 87 |

The values in Table 3 show that it is possible to substitute 30 parts of the urea-formaldehyde pigments of this invention for 30 parts of titanium dioxide, 25 parts of calcium carbonate Socal P2 and 12.5 parts of calcium

TABLE 1

Emulsion paints for interior finishes

| Substance | Example 1 parts | Example 2 parts | Example 3 parts | Example 4 parts | Example 5 parts | 1st Comparison Example parts |
|---|---|---|---|---|---|---|
| water | 90 | 40 | 40 | 40 | 40 | 60 |
| pigment disperser A ® | 1.0 | 1.0 | 1.0 | 1.0 | 1.0 | 1.0 |
| conc. ammonia | 1.0 | 1.0 | 1.0 | 1.0 | 1.0 | 1.0 |
| methyl cellulose (2%) | 100 | 100 | 100 | 100 | 100 | 100 |
| Emulan OC 20% | 2.5 | 2.5 | 2.5 | 2.5 | 2.5 | 2.5 |
| white spirit (b.p. 110-140°) | 6.0 | 6.0 | 6.0 | 6.0 | 6.0 | 6.0 |
| Texanol ®* | 4.0 | 4.0 | 4.0 | 4.0 | 4.0 | 4.0 |
| titanium dioxide[1] | — | — | — | — | — | 30.0 |
| UF pigment A | 30.0 | — | — | — | 30 | — |
| UF pigment C | — | 30.0 | — | — | — | — |
| UF pigment D | — | — | 30.0 | — | — | — |
| UF pigment E | — | — | — | 30.0 | — | — |
| Socal P 2 ®[2] | 125 | 125 | 125 | 125 | 125 | 150 |
| Novocal R ®[3] | 62.5 | 62.5 | 62.5 | 62.5 | 62.5 | 75 |
| talcum | 25.0 | 25.0 | 25.0 | 25.0 | 25.0 | 25.0 |
| Calgon N ® (10%) | 12.5 | 12.5 | 12.5 | 12.5 | 12.5 | 12.5 |
| Nopco 8034 ® | 1.0 | 1.0 | 1.0 | 1.0 | 1.0 | 1.0 |
| Acronal 290 D ®[4] | 50.0 | 50.0 | 50.0 | 50.0 | — | 50.0 |
| Mowilith DM 4 ®[5] | — | — | — | — | 50 | — |
| Total pigment concentration (% by weight) | 46.9 | 52.0 | 52.0 | 52.0 | 52.0 | 53.4 |
| weight ratio: pigments to binder | 8.2 | 8.2 | 8.2 | 8.2 | 8.2 | 9.5 |

*Texanol ® of Eastman Chem. is a 2-dimethyl-3-hydroxy-4-methyl-pentylbutyrate.
Explanation of indices 1 to 6 in Tables 1 and 4
[1]Kronos RN 56 ® available from Titangesellschaft, Leverkusen, West Germany
[2]calcium carbonate available from Solvay Werke, Solingen, West Germany
[3]calcium carbonate available from Nordbayrische Farben und Mineralwerke, Hof an der Saale, West Germany
[4]acrylate-styrene copolymer of BASF AG
[5]vinyl acetate-dibutyl maleate copolymer of Farbwerke Hoechst AG
[6]acrylate copolymer of Farbwerke Hoechst AG carbonate Novocal R simultaneously, without significant change in the hiding power (opacity) or of the degree of whiteness of the emulsion paints.

The emulsion paints of Examples 1 and 4 and the $TiO_2$-containing comparison paints are coloured with a small amount of copper phthalocyanine to an average blue shade, applied to aluminium sheets and tested for 1000 hours in a WEATHER-OMETER. Samples 1 to 4 are almost unchanged, whereas the $TiO_2$-containing paint of Comparison Example 1 is severely faded.

The scrub resistance of the coats of Examples 1 and 4 determined in accordance with DIN 53778 was 650 and 900 cycles respectively. The scrub resistance of the coat of Comparison Example 1 was 700 cycles.

Examples 6 to 9 (emulsion paints for exterior finishes)

Further emulsion paints are prepared in accordance with the preceding Examples. The composition of each paint is indicated in Table 4.

TABLE 4

| Substance | Example 6 parts | Example 7 parts | Example 8 parts | Example 9 parts | 2nd Comparison Example parts |
|---|---|---|---|---|---|
| water | 9.8 | 9.8 | 9.8 | 9.8 | 9.8 |
| 2% solution of Tylose 4000 ® | 23.5 | 23.5 | 23.5 | 23.5 | 23.5 |
| Calgon 10% | 2.8 | 2.8 | 2.8 | 2.8 | 2.8 |
| Nopco 8034 ® | 1.0 | 1.0 | 1.0 | 1.0 | 1.0 |
| conc. ammonia | 0.5 | 0.5 | 0.5 | 0.5 | 0.5 |
| butyl diglycol acetate | 1.75 | 1.75 | 1.75 | 1.75 | 1.75 |
| white spirit (b.p. 110–140° C.) | 2.75 | 2.75 | 2.75 | 2.75 | 2.75 |
| $TiO_2$ Kronos RN 56 | 45.2 | 32.0 | 45.2 | 32.00 | 56.5 |
| Socal P2 ®[2] | 17.8 | — | 17.8 | — | 33.0 |
| UF pigment A | 11,3 | 24,5 | — | — | — |
| UF pigment B | — | — | 17.8 | 24.5 | — |
| talkum | 9.5 | 9.5 | 9.5 | 9.5 | 9.5 |
| kaolin | 14.0 | 14.0 | 14.0 | 14.0 | 14.0 |
| Mowilith DM 771 ®[6] | 94.5 | 94.5 | 94.5 | 94.5 | 94.5 |
| Total concentration of pigment (% by weight) | 41.7 | 36.4 | 41.7 | 36.4 | 45.3 |
| weight ratio: pigment to binder | 2.07 | 1.69 | 2.07 | 1.69 | 2.40 |

The brush viscosities reported in Table 5 are obtained.

TABLE 5

| | Viscosity measurements (Brookfield) | | | | |
|---|---|---|---|---|---|
| | Example | | | | 2nd Comparison |
| Viscosity | 6 | 7 | 8 | 9 | Example |
| cP at 10 rpm$^{-1}$ | 25.600 | 32.960 | 30.880 | 20.640 | 28.400 |
| cP at 20 rpm$^{-1}$ | 14.700 | 19.200 | 15.680 | 12.000 | 16.400 |
| cP at 50 rpm$^{-1}$ | 7.500 | 9.700 | 8.640 | 6.110 | 8.000 |

As in Examples 1 to 5, 110–120 μm films are applied to 07P opacity panels and the following properties are measured:

TABLE 6

| | Optical measurements (exterior finishes) | | | | |
|---|---|---|---|---|---|
| Example | 6 | 7 | 8 | 9 | 2nd Comparison Example |
| opacity (%) | 99.9 | 98.4 | 98.7 | 97.0 | 98.4 |
| degree of whiteness | | | | | |
| over white | 82 | 80 | 81 | 80 | 82.0 |
| over black | 82 | 81 | 82 | 81 | 83.0 |

It is evident that the substitution of 24.5 parts of UF white pigment A or B for 24.5 parts of $TiO_2$ and 33.0 parts of $CaCO_3$ does not result in any impairment of opacity and degree of whiteness.

What is claimed is:

1. In a conventional aqueous emulsion paint composition comprising emulsified or suspended organic binders, a pigment and an aqueous medium for the binder and pigment, the improvement, to give a composition with high hiding power and whiteness, which comprises as the sole white pigment component a urea-formaldehyde condensation polymer having a light scattering coefficient of greater than or equal to 800 cm$^2$/g, a pore volume of less than or equal to 3 cm$^3$/g, an average primary particle diameter of 0.2 to 2 μm, a melting range (on decomposition) of 240° to 260° C., and a bulk density of >100 g/l.

2. An emulsion paint according to claim 1 which contains a urea-formaldehyde condensation polymer which has been prepared in the absence of protective colloids.

3. An emulsion paint according to claim 1 for interior finishes wherein the weight ratio of pigment to organic binder is 4 to 10.

* * * * *